United States Patent
Wilson

(10) Patent No.: US 10,279,725 B2
(45) Date of Patent: May 7, 2019

(54) VEHICLE LOAD BOX RAIL TRIM BRACKETS

(71) Applicant: Ford Global Technologies LLC, Dearborn, MI (US)

(72) Inventor: Geoffrey Robert Wilson, Docklands (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/875,599

(22) Filed: Jan. 19, 2018

(65) Prior Publication Data

US 2018/0244189 A1 Aug. 30, 2018

(30) Foreign Application Priority Data

Feb. 27, 2017 (CN) .......................... 2017 1 0109228

(51) Int. Cl.
| | |
|---|---|
| *B60P 7/08* | (2006.01) |
| *B60R 13/04* | (2006.01) |
| *B60R 13/01* | (2006.01) |
| *B60R 9/02* | (2006.01) |

(52) U.S. Cl.
CPC ............ *B60P 7/0815* (2013.01); *B60R 13/01* (2013.01); *B60R 13/04* (2013.01); *B60R 9/02* (2013.01)

(58) Field of Classification Search
CPC ....... B60P 7/0815; B60R 13/01; B60R 13/04; B60R 9/00
USPC ...................................................... 296/39.2
See application file for complete search history.

(56) References Cited

U.S. PATENT DOCUMENTS

| | | | |
|---|---|---|---|
| 5,228,736 A | 7/1993 | Dutton | |
| 5,873,688 A | 2/1999 | Wheatley | |
| 5,893,599 A | 4/1999 | Strohfeldt | |
| 6,102,265 A | 8/2000 | Stapleton | |
| 6,279,278 B1 * | 8/2001 | Morris .................. | E04B 2/7422 52/238.1 |
| 6,464,437 B1 * | 10/2002 | Elwell ................... | B60P 7/0807 410/106 |
| 6,913,175 B2 | 7/2005 | Martin | |
| 9,527,454 B2 * | 12/2016 | Smith ....................... | B60R 7/02 |
| 9,725,027 B2 * | 8/2017 | Hemphill ............... | B60P 7/0815 |
| 2013/0133821 A1 | 5/2013 | Ziegler et al. | |

FOREIGN PATENT DOCUMENTS

WO 2016097720 A1 6/2016

\* cited by examiner

*Primary Examiner* — Pinel E Romain
(74) *Attorney, Agent, or Firm* — Vichit Chea; Kolitch Romano, LLP

(57) ABSTRACT

Vehicle load box rail trim brackets, including a rail trim bracket comprised of a housing that is attached to a trim piece, a clamp that engages a load box rail; and a cam disposed between the housing and clamp. The housing, clamp, and cam are configured such that the clamp substantially rotates about the cam, the cam creating a metastable fulcrum point where forces between the housing, clamp, and cam are at a maximum. Rotating the clamp past the fulcrum point causes the clamp to engage the housing. The cam keeps the clamp in tension against the load box rail and in compression against the housing so as to secure the trim to the load box rail. The housing, clamp, and cam are preferably manufactured from glass-reinforced plastic.

20 Claims, 6 Drawing Sheets

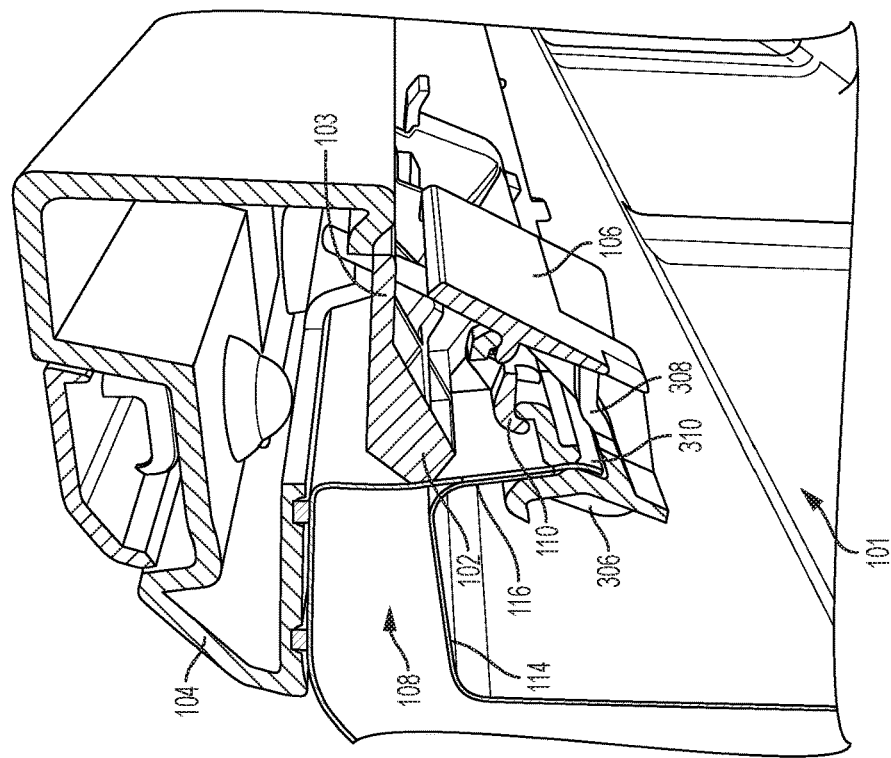
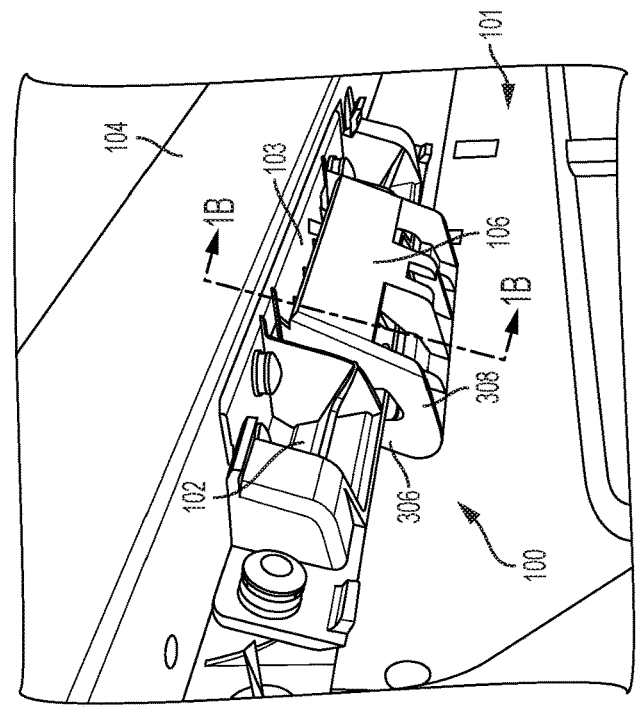
FIG. 1B
FIG. 1A

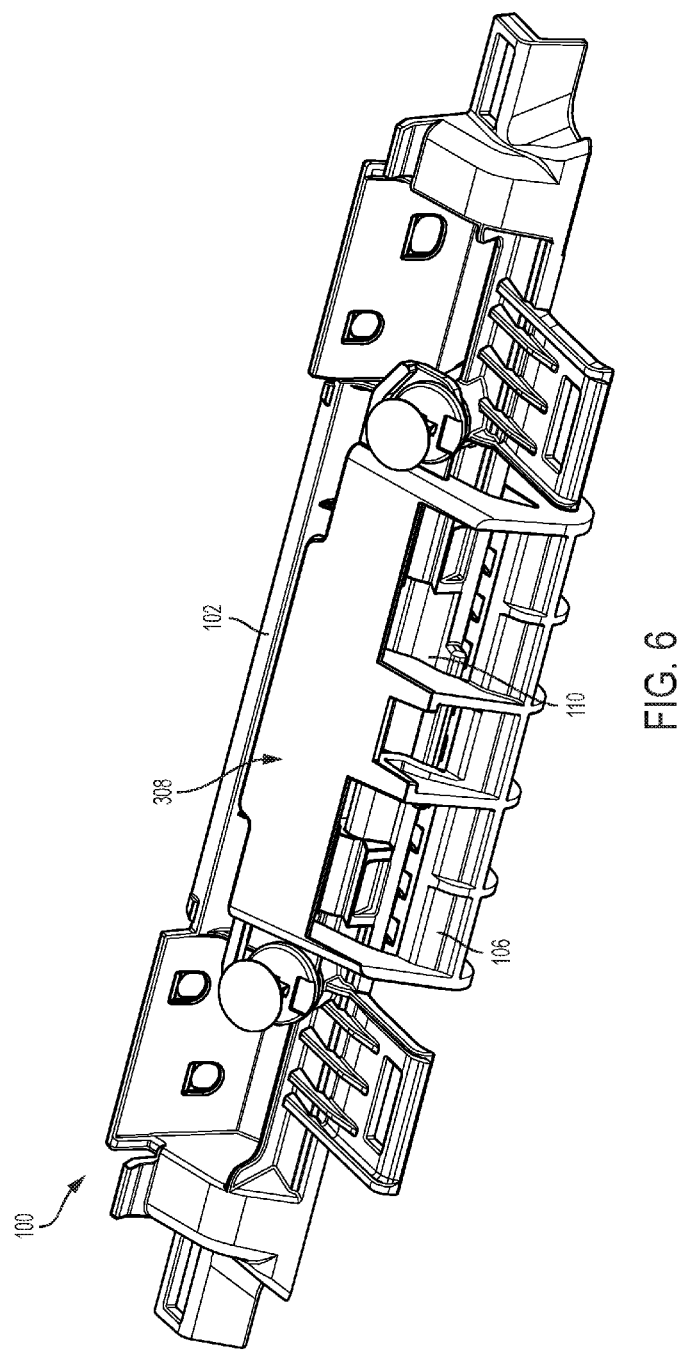

VEHICLE LOAD BOX RAIL TRIM BRACKETS

RELATED APPLICATION

This application claims the benefit of Chinese Patent Application No.: CN 201710109228.8 filed on Feb. 27, 2017, the entire contents thereof being incorporated herein by reference.

FIELD

The present disclosure relates generally to mechanisms for securing trim to vehicles. In particular, brackets for securing trim to vehicle load boxes that are light weight and low cost are described.

BACKGROUND

On motor vehicles such trucks that possess cargo beds— also known as load boxes or cargo boxes—the rim (called a rail) of the box or bed may have a trim piece attached. In addition to aesthetic purposes, this trim piece can also serve a protective role, preventing scratches or other damage to the finish of the load box rail and possible subsequent corrosion damage. These load box rail trim pieces are typically attached with a bracket mechanism to attach the trim piece to the load box.

Brackets used for attaching the trim piece are typically manufactured from steel, and are comprised of two components: a first bracket half that is attached to the load box rail, and a second half that is attached to the trim piece and is configured to engage with the first bracket half. The trim piece is then secured by disposing the second half over the first bracket half such that the second half "hooks" over the first half. Bolts securing the second half to the trim piece are tightened, causing the second half to be placed in tension and the first half to be placed in compression, opposing the second half. This combination of tension and compression holds the trim piece in place. In addition, existing brackets may be further secured together using mechanical fasteners to maintain holding integrity.

The use of steel components and mechanical fasteners to create the necessary tension and compression to hold the trim piece to the load box rail results in a mechanism that is unnecessarily heavy and relatively time intensive to install and secure, and consequently, results in unnecessary cost.

Thus, there exists a need for load box rail trim brackets that improve upon and advance the design of known brackets. Examples of new and useful load box rail trim brackets relevant to the needs existing in the field are discussed below.

U.S. Pat. No. 5,873,688 to Wheatley, for a Cargo Box Side Rail, discloses a rail that is designed to attach to the top of the sides of a pickup truck's cargo box. The box sides are described as possessing a top flange, upon which the disclosed rail sits. The rail is secured using a clamping mechanism that hooks below the top flange, and is secured by tightening a screw mechanism that draws the clamp up and tight to the underside of the top flange. The clamp is thus placed in tension, with a compressive force applied to the underside of the flange as well as between the rail and the top of the flange. These clamping mechanisms are disclosed as attached to the ends of the rail.

U.S. Pat. No. 5,228,736 to Dutton is directed to rails that mount atop the top flange of a pickup truck cargo box. The rails mount upon the top flange by way of a plurality of screws that go through the rail and into an interior vertical portion of the top flange. Fastening points can be placed in and secured to the rails to facilitate securing of cargo within the box.

Finally, U.S. Pat. No. 6,913,175 to Martin discloses rails that are secured to the top of a pickup truck cargo box. These rails are secured using conventional means, such as bolts or screws. To each rail a bracket is clamped on, and between a bracket attached to each rail on opposing sides of the cargo box is attached a stringer for supporting cargo loads. The brackets are clamped on using a single piece clamp that can be secured with a bolt or screw.

SUMMARY

The present disclosure is directed to rail trim brackets for securing trim pieces to vehicle load box rails. According to a first aspect, a rail trim bracket for securing a trim piece to a vehicle load box rail comprises a housing; a clamp; and a cam disposed between the housing and clamp. The housing, the clamp and the cam are configured to interact to create a retention-release mechanism to allow rotation of the clamp from an open position to a clamped position to attach the trim piece to the load box rail.

In a first embodiment, the rail trim bracket further comprises a plurality of hook-shaped protrusions and a plurality of sliding surfaces located on each of the housing, clamp, and cam. The plurality of hooks and sliding surfaces of the housing, the clamp, and the cam interact to create a retention-release mechanism as the clamp substantially rotates about a longitudinal axis of the cam, the cam is sized so as to create a fulcrum point as the clamp substantially rotates about the longitudinal axis of the cam, and the clamp is at the clamped position when the clamp is rotated past the fulcrum point and the cam keeps the clamp in tension against the load box rail and in compression against the housing so as to secure the trim piece to the load box rail.

In another embodiment, the cam possesses one or more sliding surfaces; and the clamp possesses one or more sliding surfaces that are complementary to the sliding surfaces of the cam, and slideably engage the cam sliding surfaces as the clamp is rotated.

In yet another embodiment, the cam possesses one or more hook-shaped protrusions; and the clamp possesses one or more hook-shaped protrusions that are complementary to and engage with the hook-shaped protrusions of the cam so as to retain the clamp.

In still another embodiment, the housing and clamp are manufactured from glass-reinforced nylon and the cam is manufactured from a glass-reinforced acetal.

According to a second aspect, a rail trim bracket for securing a trim piece to a top surface of a sidewall of a vehicle load box comprise a housing having a first portion attached to the trim piece; a clamp configured to engage the sidewall, further comprising one or more hooks; and a cam disposed between the housing and clamp, the cam having a longitudinal axis and one or more hooks corresponding to the one or more hooks on the clamp. The clamp is movably retained by the cam through the interaction of the one or more hooks on the clamp with the one or more corresponding hooks on the cam, such that the clamp is moveable about the cam's longitudinal axis, when the clamp is rotated toward the first portion of the housing, the cam, housing and clamp interact against the sidewall to create a fulcrum point prior to the clamp reaching the first portion of the housing, and as the clamp passes through the fulcrum point, the interaction between the housing, cam, clamp and sidewall impart tension on the clamp and a compression on the housing to maintain the clamp at the clamped position and the trim piece in contact with the top surface of the sidewall.

In one embodiment, the cam further comprises one or more second hooks; and the housing further comprises one or more hooks that correspond to the one or more second hooks, the cam being retained to the housing by the interaction of the one or more second hooks with the one or more hooks of the housing.

In a second embodiment, the cam further comprises one or more sliding surfaces; and the clamp further comprises one or more sliding surfaces that are complementary to the sliding surfaces of the cam, and slideably engage the cam sliding surfaces as the clamp is rotated.

In a third embodiment, the cam further comprises one or more second sliding surfaces; and the housing further comprises one or more sliding surfaces that are complementary to the second sliding surfaces of the cam, and engage the cam second sliding surfaces.

In a fourth embodiment, the clamp engages the sidewall by way of a side flange that extends perpendicularly from the top surface of the sidewall.

In yet another embodiment, the housing and clamp are manufactured from glass-reinforced nylon, and the cam is manufactured from glass-reinforced acetal.

According to a third aspect, a vehicle comprises a load box side that has a top flange that extends perpendicular to the load box side, with a side flange further extending perpendicular from the end of the top flange in the direction of and parallel to the load box side; a trim piece disposed upon the top flange; and a rail trim bracket to attach the trim piece to the load box side, which is further comprised of a housing including a first portion disposed upon the trim piece so as to substantially face away from the load box side, wherein the housing includes one or more hooks and one or more sliding surfaces; a clamp further comprising a first section configured to fit between load box side and side flange, the first section connected to a second section that is disposed proximate to the side flange and away from the load box side such that the first section and second section encompass both sides of the side flange, the second section further configured to fit within the housing and including one or more hooks and one or more sliding surfaces; and a cam with a longitudinal axis, the cam disposed substantially between the housing and clamp, and comprised of one or more first hooks that are complementary to the housing's one or more hooks, one or more second hooks that are complementary to the clamp's one or more hooks, one or more first sliding surfaces that are complementary to the housing's one or more sliding surfaces, and one or more second sliding surfaces that are complementary to the clamp's one or more sliding surfaces. The cam is rotatably attached to the housing by the one or more first hooks engaging with the housing's one or more hooks, the cam is rotatably attached to the clamp by the one or more second hooks engaging with the clamp's one or more hooks, the cam is sized so as to create a metastable fulcrum point where forces between the housing, clamp, side flange and cam are at a maximum, and applying force to the clamp towards the housing past the fulcrum point causes the clamp to engage the housing, placing the clamp in tension between the housing and side flange, thereby securing the trim piece to the top flange by a compressive force.

In one embodiment, the vehicle is a truck.

In another embodiment, the housing's one or more hooks extend from the housing in the direction away from the load box side, the cam's one or more first hooks extend in a direction substantially opposite from the direction of the cam's one or more second hooks of the cam, and the clamp's one or more hooks extend from the clamp in a direction towards the load box side.

In another embodiment, the cam's one or more first hooks and one or more second hooks are disposed about a central section of the cam; and the cam's one or more first sliding surfaces and one or more second sliding surfaces each comprise two first sliding surfaces and two second sliding surfaces, with one each of the first sliding surfaces and second sliding surfaces being disposed on an end positioned along the cam's longitudinal axis on either side of the central section of the cam.

In yet another embodiment, the first sliding surface and second sliding surface on each of the cam's end are disposed so as to face in opposite directions.

In another embodiment, the housing and clamp have an elongated shape along and parallel to the cam's longitudinal axis.

In another embodiment, the clamp's first section and second section are configured to create a channel that extends substantially parallel to the cam's longitudinal axis, the channel further being configured to receive the side flange.

In another embodiment, the clamp's one or more sliding surfaces and the housing's one or more sliding surfaces are substantially convex in shape, and the cam's one or more first sliding surfaces and one or more second sliding surfaces are substantially concave in shape.

In still another embodiment, the housing and clamp are manufactured from glass-reinforced nylon, and the cam is manufactured from glass-reinforced acetal.

BRIEF DESCRIPTION OF THE DRAWINGS

FIG. 1A is a perspective view of an example of a load box rail trim bracket, mounted to a trim piece and vehicle load box rail.

FIG. 1B is a cross-sectional view of the example load box rail trim bracket depicted in FIG. 1A.

FIG. 6 is a perspective view of the load box rail trim bracket depicted in FIG. 2 in assembled and closed configuration.

DETAILED DESCRIPTION

Figure 2:
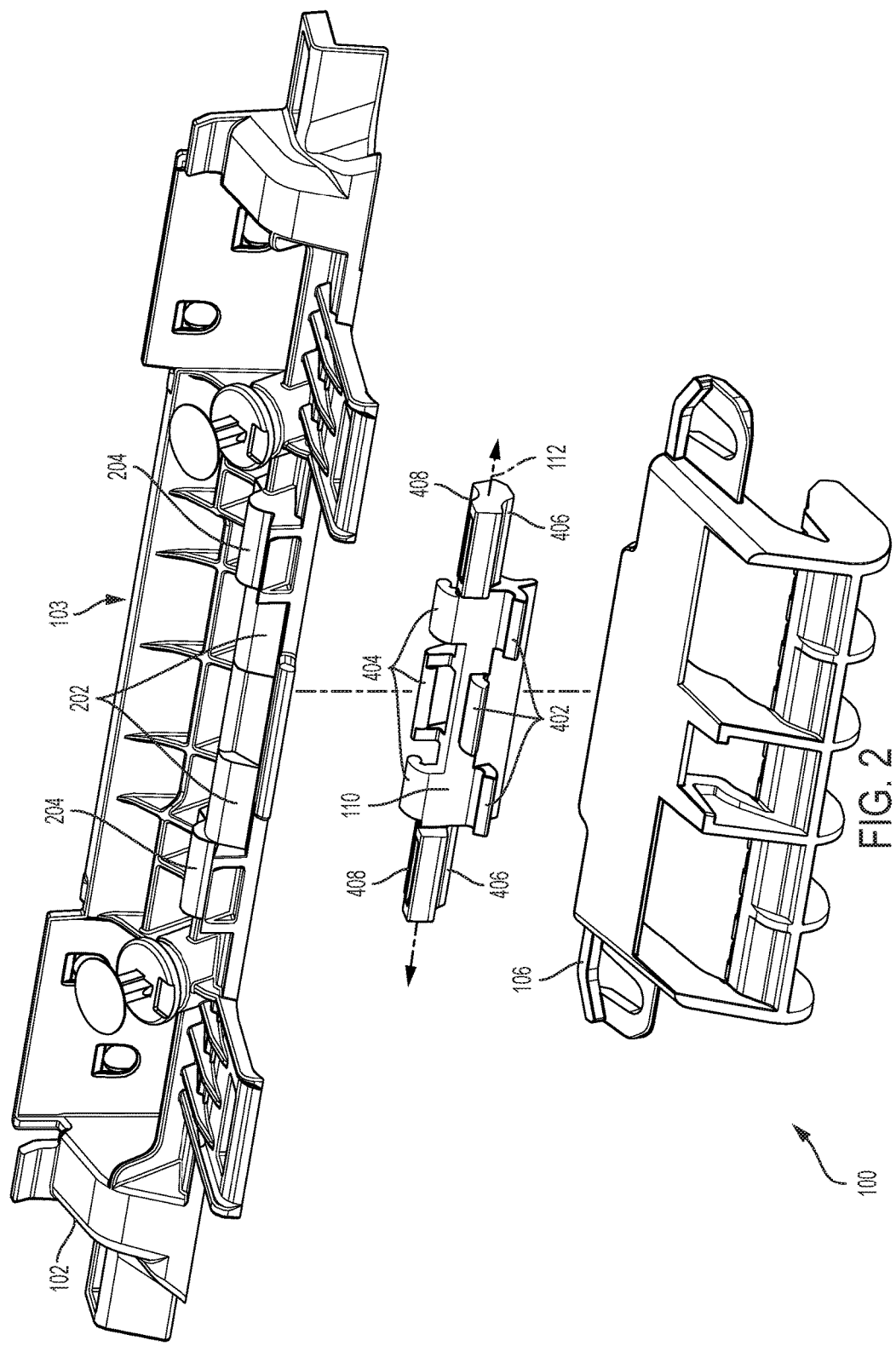
FIG. 2 is an exploded view of the load box rail trim bracket shown in FIG. 1 depicting each individual component.

The disclosed rail trim brackets will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, examples of various rail trim brackets are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-6, an example of a vehicle load box rail trim bracket, rail trim bracket 100, will now be described. Rail trim bracket 100 functions to provide a lightweight and cost-effective means by which a load or cargo box trim piece can be secured to a top rail of the cargo or load box found on a typical consumer-grade pickup truck or cross-over vehicle.

Rail trim bracket 100 provides a means for securing a trim piece to the top rail of a vehicle cargo box. Rail trim bracket 100 can be made out of lightweight engineered plastic materials, such as glass-filled nylon and acetal. The use of engineering plastics reduces the weight and costs associated with using a metal bracket. As the trim piece is primarily decorative and is not intended to be load-bearing, the rail trim bracket 100 can be made from any plastic that can provide sufficient strength required for securing the trim piece to the top rail.

Further, rail trim bracket 100 essentially comprises a retention-release mechanism in the form of a latch that can be secured without the need for special tools, effectively with a person's hands. A hooked portion of a clamp, which is part of rail trim bracket 100, is hooked around the cargo box rail. The associated trim piece is then quickly secured by pushing the clamp past a fulcrum point. As the clamp is pushed towards the fulcrum point, the force the installer must apply increases until reaching the fulcrum point. The fulcrum point is the point of travel of the clamp that presents maximum resistance to the installer's efforts, after which the clamp snaps shut into a housing that is also part of rail trim bracket 100. The housing is affixed to the trim piece. Once snapped shut, the clamp remains in tension by a cam, part of rail trim bracket 100 that is interposed between the clamp and the housing, which causes the hook of the clamp to pull against the box rail, and the housing to impart a compressive force between the trim piece and the cargo box rail, thereby securing the trim piece into position. As no special tools are needed and the clamp can be quickly shut, the trim piece can be installed more quickly than conventional metal brackets that require tightening a screw mechanism, which, in addition to being more time consuming, may require use of tools. This time savings further serves to reduce production costs.

In some vehicle implementation, a plurality of rail trim brackets 100 may be employed to secure a single trim piece to the cargo box rail.

Referring to FIGS. 1A to 2, rail trim bracket 100 includes a housing 102 that is disposed upon a trim piece 104, a cam 110 with a longitudinal axis 112, and a clamp 106 rotatably connected to housing 102 via cam 110. Housing 102 may include a first portion 103 configured to be connected to trim piece 104. In the depicted embodiment, the load box includes a load box rail 108. Load box rail 108 is further comprised of a top flange 114 attached to cargo box sidewall 101, and a side flange 116 that extends perpendicularly down from top flange 114, towards the floor of the load box and approximately parallel to cargo box sidewall 101. Cam 110 is disposed between housing 102 and clamp 106.

Each of housing 102, clamp 106 and cam 110 are configured to interact to create a retention-release mechanism, to allow rotation of clamp 106 between an open position and a clamped position. For example, clamp 106 may substantially rotate about longitudinal axis 112 of cam 110. Cam 110 is configured to create a metastable fulcrum point in the travel of clamp 106 as it rotates with respect to housing 102 and cam 110, where forces between housing 102, clamp 106, and cam 110 are at a maximum. At the fulcrum point, clamp 106 is in maximum tension between cam 110 and side flange 116. The fulcrum point is metastable, so that rotating clamp 106 towards housing 102 past the fulcrum point results in tension being partially released from clamp 106 so as to drive it further towards and into housing 102. The interaction between housing 102, clamp 106 and cam 110 keeps clamp 106 in tension against side flange 116 and in compression against housing 102 by way of cam 110. As housing 102 is attached to trim piece 104, this compression acts through housing 102 to secure trim piece 104 to load box rail 108. Similarly, rotating clamp 106 away from housing 102 results in the tension being released from clamp 106 so as to drive it to disengage from side flange 116 and results in rail trim bracket 100 being unlatched.

In some embodiments, housing 102 and clamp 106 may be injection molded from 30% glass-reinforced nylon to impart strength and durability to the system and cam 110 may be injection molded from glass-reinforced acetal, providing ease of movement and creep/compression resistance. It should be appreciated that housing 102, clamp 106 and cam 110 may be manufactured from any suitable material now known or later developed, including other types of plastics, or metal, such as aluminum.

Housing 102 is secured to trim piece 104 prior to securing to the cargo box rail, preferably by relatively permanent means, such as via screws that pass through provided holes in housing 102 and into corresponding holes or screw inserts provided in trim piece 104. Such holes or inserts are typically previously provided during the manufacture of trim piece 104. Alternatively, housing 102 could be integrally molded as part of trim piece 104, using well-known plastics manufacturing techniques. For example, housing 102 could be integrated into trim piece 104 using an overmold process, with prefabricated housings 102 being placed into a mold for trim piece 104. Housing 102 is preferably manufactured from a reinforced material such as 30% minimum glass-reinforced nylon (PA6-G30), but could be manufactured from any suitable material now known or later developed, including other types of plastics, or metal, such as aluminum.

Figure 3:
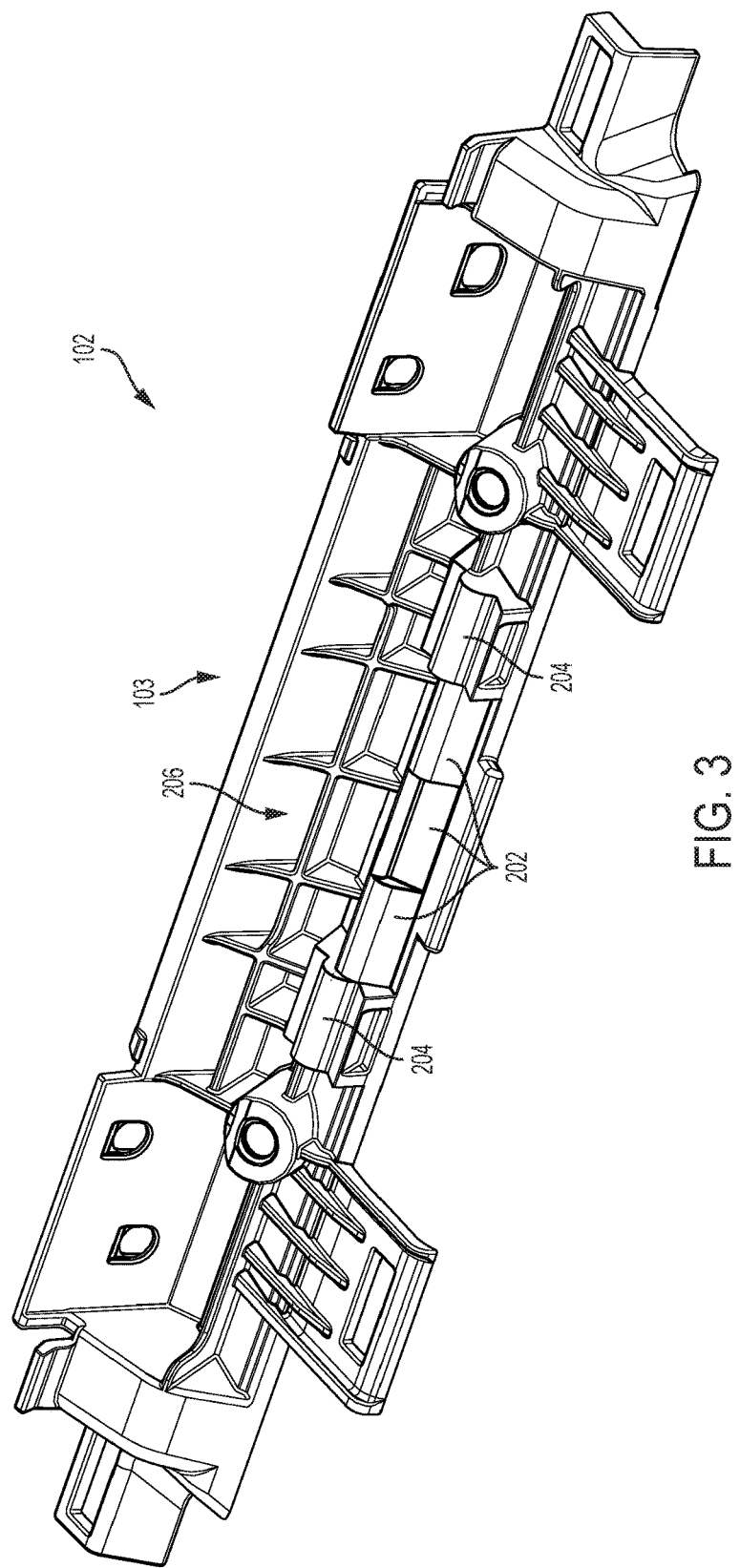
FIG. 3 is a perspective view of the bracket housing of the load box rail trim bracket shown in FIG. 2.

Referring to FIG. 3, the features of housing 102 are shown in greater detail. Housing 102 includes one or more hook-shaped projections (hooks) 202, that interface with corresponding hook projections on cam 110, which will be discussed further herein. These hooks 202 serve to center and properly align the other components of rail trim bracket 100 so as to ensure proper closure of rail trim bracket 100 and proper securing of trim piece 104. Also seen in FIG. 3 are one or more sliding surfaces 204. Sliding surfaces 204 correspond to and interface with corresponding sliding surfaces on cam 110. Sliding surfaces 204 act as bearing surfaces to accommodate the movement of cam 110, and further act to receive the bulk of the compressive forces imposed by clamp 106 when it is in its closed position. Compressive force transmitted to bracket housing 102 via sliding surfaces 204 is in turn transmitted to trim piece 104 to which bracket housing 102 is attached, thereby securing trim piece 104 to load box rail 108. It will be understood that housing 102 must be attached to trim piece 104 in a manner that is sufficiently robust to withstand the continued compressive force applied from housing 102 to maintain trim piece 104 in secure contact with load box rail 108.

Housing 102 further includes recess 206 which is sized and shaped to accommodate a portion of clamp 106 as will be discussed herein. Recess 206 allows clamp 106 to neatly secure into housing 102 without protruding into the cargo space of the load box when rail trim bracket 100 is closed, thereby preventing a possible snag hazard, or possible damage from cargo placed inside the load box. When clamp 106 is engaged within recess 206, cam 110, hooks 202 and sliding surfaces 204 are further hidden and protected from damage. Finally, as can been seen in the figures, housing 102 may have various other projections and features that can add attachment points for different types of trim pieces 104, or may serve other useful purposes, such as providing structural reinforcement and strength to housing 102 to ensure that housing 102 can transmit compressive force to trim piece 104 without failure over the lifetime of the various components.

Figure 4:
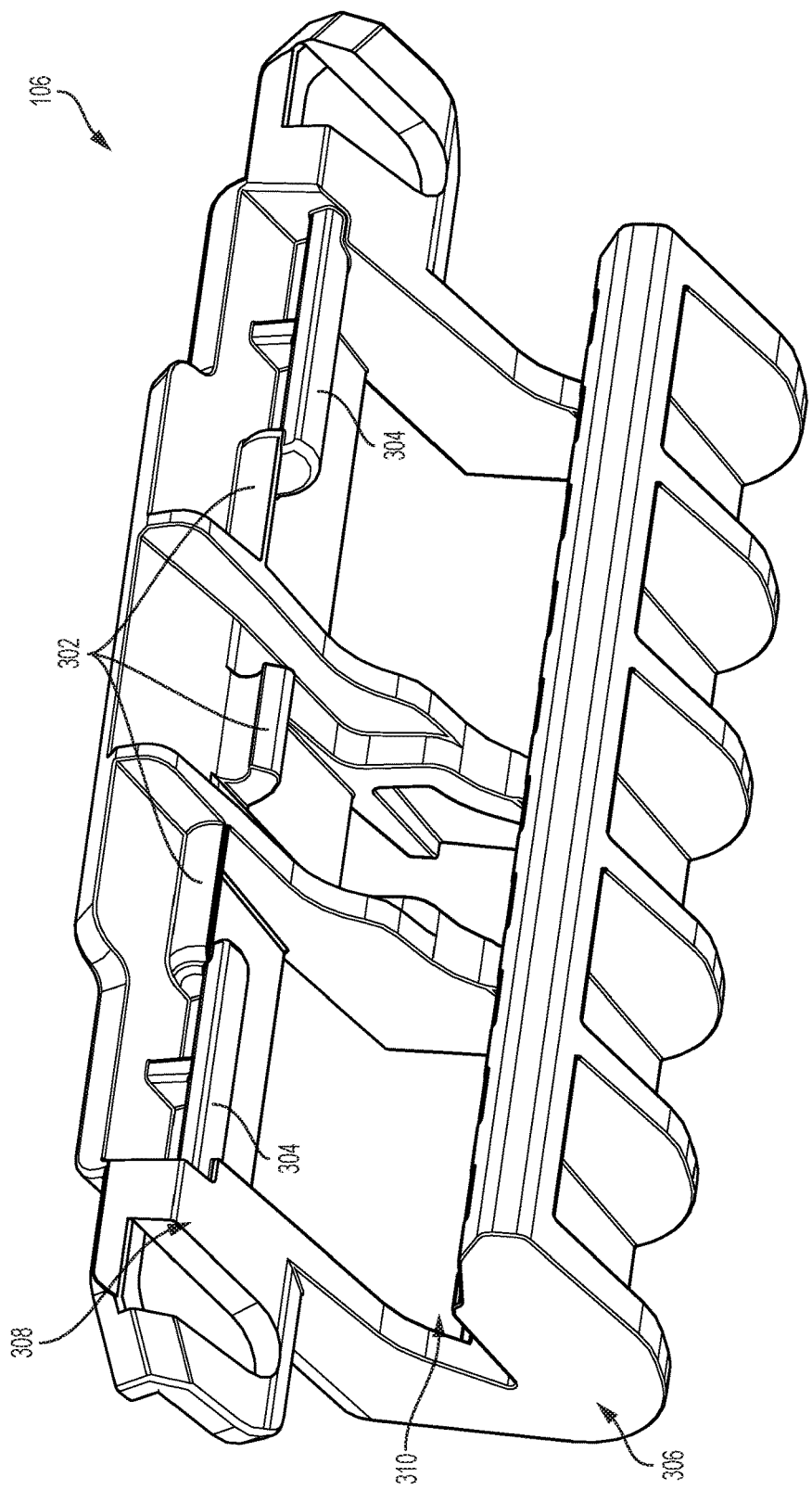
FIG. 4 is a perspective view of the bracket clamp of the load box rail trim bracket shown in FIG. 2.

Turning to FIG. 4, clamp 106 is depicted. Clamp 106 possesses one or more hook-shaped projections, or hooks 302, which are positioned and designed to engage with corresponding hook projections on cam 110. Further, clamp 106 includes one or more sliding surfaces 304 which serve to both provide bearing surfaces as clamp 106 rotates against cam 110, as well as provide the surfaces by which clamp 106, when held in tension, transmits compressive force to housing 102 by way of cam 110, so that trim piece 104 is held secure to load box rail 108.

Clamp 106 is comprised of a first section 306 and second section 308. These two sections 306 and 308 define a channel 310, so that clamp 106 is shaped similar to the letter J. Channel 310 is intended to engage a side portion of a flange located on the top of load box rail 108 (e.g., side flange 116). Load box rail 108, as can be seen in FIG. 1B, is composed of a top flange 114 that extends perpendicular from the top of the cargo box sidewall, and a further side flange 116 that extends from the end of top flange 114 in a substantially parallel fashion to cargo box sidewall 101, towards the cargo box floor. In some implementations top flange 114 extends inward towards the center of the cargo box; however, top flange 114 could extend out away from the exterior of the cargo box and cargo box sidewall 101. Trim piece 104 is secured to the upper surface of top flange 114 of load box rail 108. Side flange 116 engages with channel 310, thereby receiving compressive force from clamp 106 when it is secured into housing 102. Thus, as depicted in FIGS. 1A and 1B, when trim piece 104 is secured by rail trim bracket 100, first section 306 is substantially placed against the side flange 114, relatively adjacent to cargo box sidewall 101. Second section 308 is correspondingly disposed adjacent to the side of side flange 114 that is distal from cargo box sidewall 101.

Referring to FIG. 6, the top of second section 308 of clamp 106 is preferably shaped to engage with and be received into recess 206 of housing 102, and to fit flush with housing 102 when so engaged. Likewise, the top of second section 308 may be shaped in a handle or paddle configuration to facilitate closing of rail trim bracket 100 to secure trim piece 104.

As with housing 102, clamp 106 is preferably manufactured from an engineered plastic such as glass-reinforced nylon (such as PA6-G30), or other similar material. Clamp could, however, be manufactured from any suitable material, such as different types of plastics, composites, or metals. Such materials should be suitable to withstand the imposition the continuous tension stress imposed upon clamp 106 when it is engaged into housing 102. Clamp 106, as can be seen in FIG. 4, may include different features not described herein depending upon the vehicle application, and/or may include features specifically intended to improve the structural rigidity and strength of clamp 106.

Figure 5:
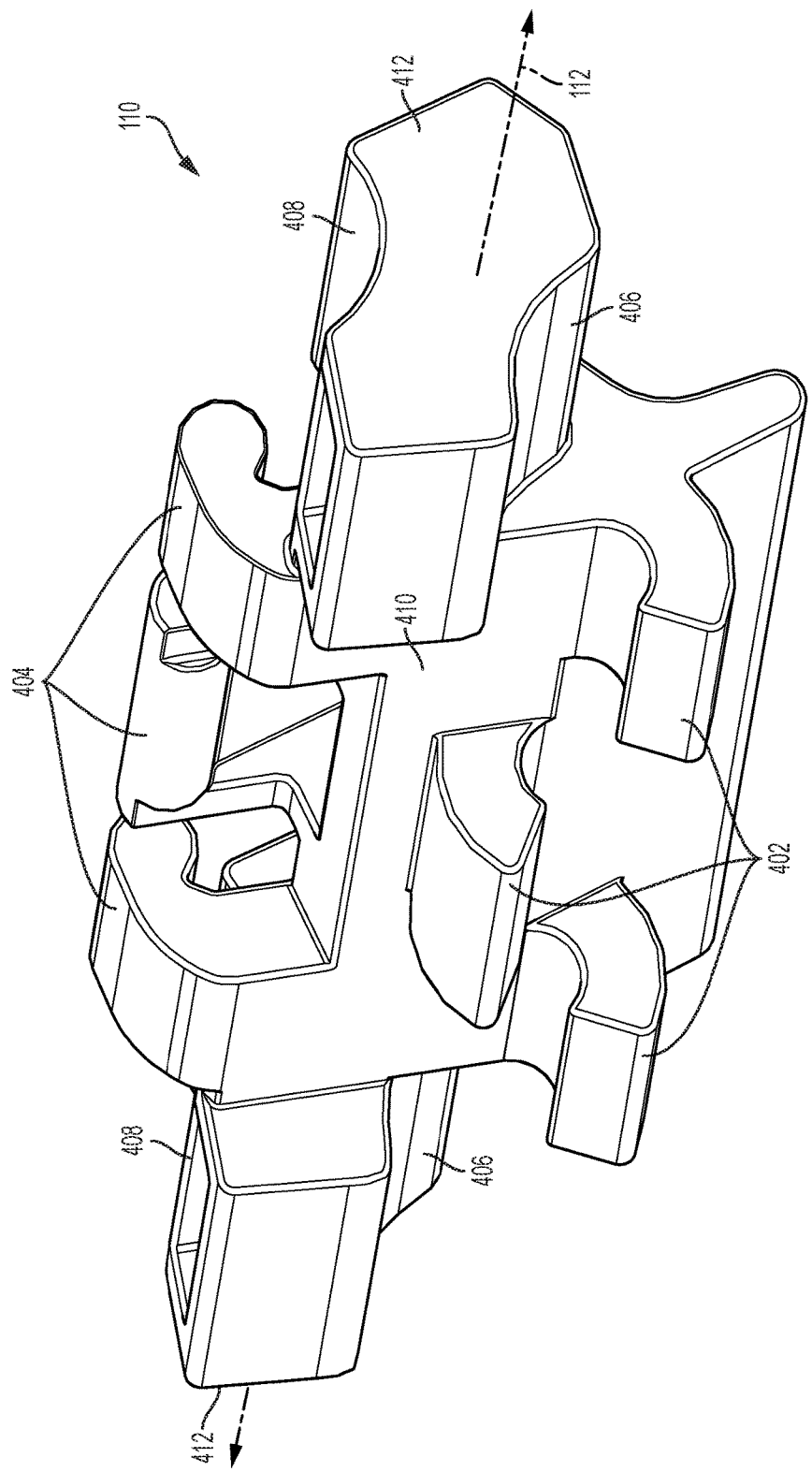
FIG. 5 is a perspective view of the cam of the load box rail trim bracket shown in FIG. 2.

Cam 110 is shown in FIG. 5. Cam 110 includes one or more first hooks 404 and one or more second hooks 402. In the depicted embodiment first hooks 404 and second hooks 402 are arranged around a center section 410 of cam 110. First hooks 404 are complementary to and arranged to engage each of hooks 202 of housing 102. Likewise, second hooks 402 are complementary to and arranged to engage each of hooks 302 of clamp 106. Cam 110 further includes one or more first sliding surfaces 408 and one or more second sliding surfaces 406. As can be seen in the depicted embodiment of FIG. 5, first sliding surfaces 408 and second sliding surfaces 406 are disposed on either end 412 of cam 110 along longitudinal axis 112 with respect to center section 410. Each end 412 has one first sliding surface 408 and one second sliding surface 406, each such first sliding surface 408 being disposed so as to face in an opposite direction from the corresponding second sliding surface 406. First sliding surfaces 408 are configured and disposed so as to engage with sliding surfaces 204 of housing 102, and second sliding surfaces 406 are configured and disposed so as to engage with sliding surfaces 304 of clamp 106.

As can be seen in FIGS. 2 and 5, cam 110 possesses a longitudinal axis 112. Cam 110 is positioned between housing 102 and clamp 110 so that longitudinal axis 112 is arranged parallel in a lengthwise fashion. When first hooks 404 and second hooks 402 are engaged with their corresponding hooks 202 on housing and 302 on clamp, clamp 106 is retained to cam 110, which is in turn retained to housing 102. Further, second hooks 402 and corresponding hooks 302 on clamp 106 are configured to form a hinge that allows clamp 106 to rotate with respect to longitudinal axis 112. Likewise, the interaction between first hooks 404 and corresponding hooks 202 of housing 102 allows cam 110 to rotate with respect to housing 102.

As can be seen in FIG. 5, cam 110 is roughly cylindrical in shape. First hooks 404 and second hooks 402, along with first sliding surfaces 408 and second sliding surfaces 406, are positioned along the body of cam 110, and cam 110 is appropriately sized, so as to create a metastable fulcrum point when clamp 106 is rotated towards housing 102, when the side flange of load box rail 108 is placed into channel 310 of clamp 106. This fulcrum point is created by the interaction between the side flange, clamp 106, cam 110, and housing 102, imposed by the size and shape of cam 110 relative to the overall height of the side flange, depth of channel 310, and size of clamp 106. The fulcrum point will be reached and passed prior to clamp 106 engaging into housing 102.

With clamp 106 hooked to the load box rail 108 so that the side flange 116 is placed within channel 310, applying pressure to the top of second section 308 to move clamp 106 towards housing 102 will necessitate applying increasing pressure as clamp 106 rotates towards housing 102 and approaches the fulcrum point. At the fulcrum point, maximum force will be reached, with clamp 106 under maximum tension and the compressive forces transmitted to the various sliding surfaces of clamp 106, cam 110, and housing 102 likewise at maximum. As the fulcrum point is metastable, applying force to clamp 106 in either the direction towards housing 102 or away from housing 102 will cause an increasing release of tension from clamp 106 and the associated compressive forces upon the sliding surfaces. This increasing release will urge clamp 106 either to a fully released state, if the force applied clamp 106 is away from housing 102, or into fully engaging with housing 102, if the force applied to clamp 106 is towards housing 102. Thus, the fulcrum point is metastable—its tendency is to flip clamp 106 to either a fully released state or engaged with housing 102.

It will be appreciated by a person skilled in the relevant art that because of the metastable nature of the fulcrum point and its location in the travel of clamp 106 prior to full engagement with housing 102, when clamp 106 is engaged into housing 102 it will require the application of increasing force to cause clamp 106 to reach the fulcrum point and release. Thus, clamp 106 is positively retained engaged into housing 102, which in turn keeps trim piece 104 secure to load box rail 108. When clamp 106 is engaged into housing 102, it remains under tension, with an opposing compressive force applied to the side flange via interaction with channel 310. Similarly, compressive force is applied between trim piece 104 to load box rail 108 which retains trim piece 104. This compressive force is applied from the interaction between sliding surfaces 304 and cam's 110 second sliding surfaces 406, which in turn transmit through cam 110 to cam's 110 first sliding surfaces 408 that interact with sliding surfaces 204 of housing 102, which in turn is attached to trim piece 104. Thus, when clamp 106 is engaged in housing 102, the various sliding surfaces act as bearing surfaces to transmit compressive force.

Cam 110 is preferably manufactured from an engineered plastic material such as glass-reinforced acetal or delryn, which are both capable of withstanding the compressive stresses imposed in the action of rail trim bracket 100, as well as offer inherent lubrication properties to aid in passing the fulcrum point when rail trim bracket 100 is closed by engaging clamp 106 into housing 102. However, any suitable material that possesses these qualities may be employed, including other plastics, composites, metals, or any other appropriate material now known or later developed.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A rail trim bracket for securing a trim piece to a vehicle load box rail, comprising:
   a housing;
   a clamp; and
   a cam disposed between the housing and clamp,
   wherein the housing, the clamp and the cam are configured to interact to create a retention-release mechanism to allow rotation of the clamp from an open position to a clamped position to attach the trim piece to the load box rail.

2. The rail trim bracket of claim 1, further comprising a plurality of hooks and a plurality of sliding surfaces located on each of the housing, clamp, and cam, and wherein:
   the plurality of hooks and sliding surfaces of the housing, the clamp, and the cam interact to create a retention-release mechanism as the clamp substantially rotates about a longitudinal axis of the cam,
   the cam is sized so as to create a fulcrum point as the clamp substantially rotates about the longitudinal axis of the cam, and
   the clamp is at the clamped position when the clamp is rotated past the fulcrum point and the cam keeps the clamp in tension against the load box rail and in compression against the housing so as to secure the trim piece to the load box rail.

3. The rail trim bracket of claim 1, wherein:
   the cam possesses one or more sliding surfaces; and
   the clamp possesses one or more sliding surfaces that are complementary to the sliding surfaces of the cam, and slideably engage the cam sliding surfaces as the clamp is rotated.

4. The rail trim bracket of claim 3, wherein:
   the cam possesses one or more hooks; and
   the clamp possesses one or more hooks that are complementary to and engage with the hooks of the cam so as to retain the clamp.

5. The rail trim bracket of claim 1, wherein the housing and clamp are manufactured from glass-reinforced nylon and the cam is manufactured from a glass-reinforced acetal.

6. A rail trim bracket for securing a trim piece to a top surface of a sidewall of a vehicle load box, comprising:
   a housing having a first portion attached to the trim piece;
   a clamp configured to engage the sidewall, comprising one or more hooks; and
   a cam disposed between the housing and clamp, the cam having a longitudinal axis and one or more first hooks corresponding to the one or more hooks on the clamp,
   wherein:
      the clamp is movably retained by the cam through the interaction of the one or more hooks on the clamp with the one or more corresponding first hooks on the cam, such that the clamp is moveable about the cam's longitudinal axis,
      when the clamp is rotated toward the first portion of the housing, the cam, housing and clamp interact against the sidewall to create a fulcrum point prior to the clamp reaching the first portion of the housing, and
      as the clamp passes through the fulcrum point, the interaction between the housing, cam, clamp and sidewall impart tension on the clamp and a compression on the housing to maintain the clamp at the clamped position and the trim piece in contact with the top surface of the sidewall.

7. The rail trim bracket of claim 6, wherein:
the cam further comprises one or more second hooks; and
the housing further comprises one or more hooks that correspond to the one or more second hooks, the cam being retained to the housing by the interaction of the one or more second hooks with the one or more hooks of the housing.

8. The rail trim bracket of claim 7, wherein:
the cam further comprises one or more sliding surfaces; and
the clamp further comprises one or more sliding surfaces that are complementary to the sliding surfaces of the cam, and slideably engage the cam sliding surfaces as the clamp is rotated.

9. The rail trim bracket of claim 8, wherein:
the cam further comprises one or more second sliding surfaces; and
the housing further comprises one or more sliding surfaces that are complementary to the second sliding surfaces of the cam, and engage the cam second sliding surfaces.

10. The rail trim bracket of claim 9, wherein the clamp engages the sidewall by way of a side flange that extends perpendicularly from the top surface of the sidewall.

11. The rail trim bracket of claim 10, wherein the housing and clamp are manufactured from glass-reinforced nylon, and the cam is manufactured from glass-reinforced acetal.

12. A vehicle comprising:
a load box side that has a top flange that extends perpendicular to the load box side, with a side flange further extending perpendicular from the end of the top flange in the direction of and parallel to the load box side;
a trim piece disposed upon the top flange; and
a rail trim bracket to attach the trim piece to the load box side, comprised of:
  a housing including a first portion disposed upon the trim piece so as to substantially face away from the load box side, wherein the housing includes one or more hooks and one or more sliding surfaces;
  a clamp comprising a first section configured to fit between load box side and side flange, the first section connected to a second section that is disposed proximate to the side flange and away from the load box side such that the first section and second section encompass both sides of the side flange, the second section further configured to fit within the housing and including one or more hooks and one or more sliding surfaces; and
  a cam with a longitudinal axis, the cam disposed substantially between the housing and clamp, and comprised of one or more first hooks that are complementary to the housing's one or more hooks, one or more second hooks that are complementary to the clamp's one or more hooks, one or more first sliding surfaces that are complementary to the housing's one or more sliding surfaces, and one or more second sliding surfaces that are complementary to the clamp's one or more sliding surfaces, wherein:
    the cam is rotatably attached to the housing by the one or more first hooks engaging with the housing's one or more hooks,
    the cam is rotatably attached to the clamp by the one or more second hooks engaging with the clamp's one or more hooks,
    the cam is sized so as to create a metastable fulcrum point where forces between the housing, clamp, side flange and cam are at a maximum, and
    applying force to the clamp towards the housing past the fulcrum point causes the clamp to engage the housing, placing the clamp in tension between the housing and side flange, thereby securing the trim piece to the top flange by a compressive force.

13. The vehicle of claim 12, wherein the vehicle is a truck.

14. The vehicle of claim 12 wherein:
the housing's one or more hooks extend from the housing in the direction away from the load box side,
the cam's one or more first hooks extend in a direction substantially opposite from the direction of the cam's one or more second hooks of the cam, and
the clamp's one or more hooks extend from the clamp in a direction towards the load box side.

15. The vehicle of claim 14 wherein:
the cam's one or more first hooks and one or more second hooks are disposed about a central section of the cam; and
the cam's one or more first sliding surfaces and one or more second sliding surfaces each comprise two first sliding surfaces and two second sliding surfaces, with one each of the first sliding surfaces and second sliding surfaces being disposed on an end positioned along the cam's longitudinal axis on either side of the central section of the cam.

16. The vehicle of claim 15 wherein the first sliding surface and second sliding surface on each of the cam's end are disposed so as to face in opposite directions.

17. The vehicle of claim 16, wherein the housing and clamp have an elongated shape along and parallel to the cam's longitudinal axis.

18. The vehicle of claim 17, wherein the clamp's first section and second section are configured to create a channel that extends substantially parallel to the cam's longitudinal axis, the channel further being configured to receive the side flange.

19. The vehicle of claim 18, wherein the clamp's one or more sliding surfaces and the housing's one or more sliding surfaces are substantially convex in shape, and
the cam's one or more first sliding surfaces and one or more second sliding surfaces are substantially concave in shape.

20. The vehicle of claim 19 wherein the housing and clamp are manufactured from glass-reinforced nylon, and the cam is manufactured from glass-reinforced acetal.

* * * * *